Aug. 1, 1950 — J. L. BROCK — 2,517,176
TRAILER HITCH BALL COVER
Filed Nov. 6, 1948
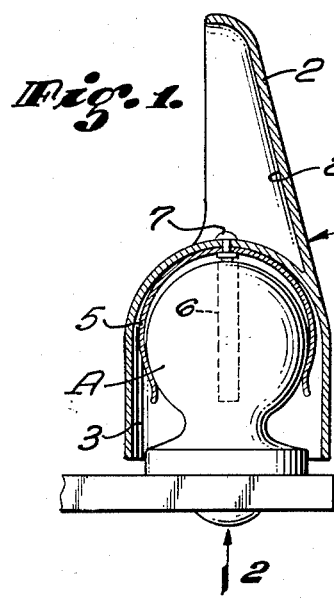
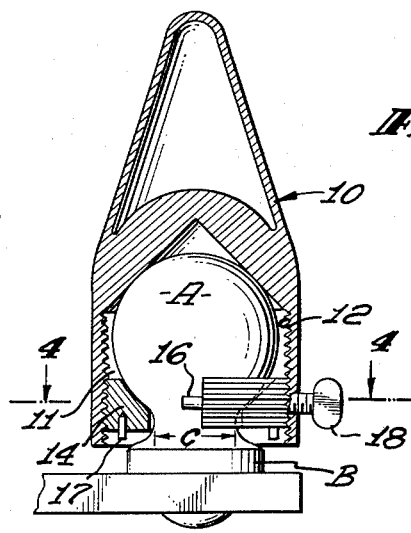
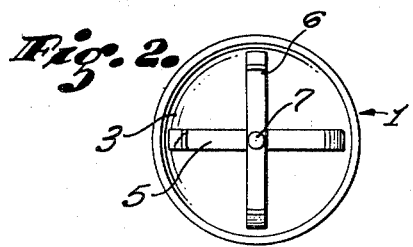
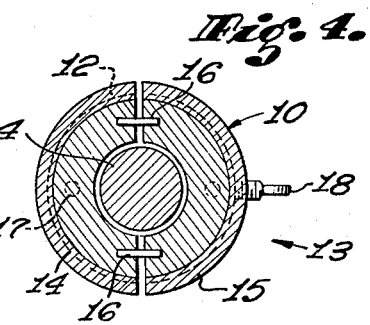
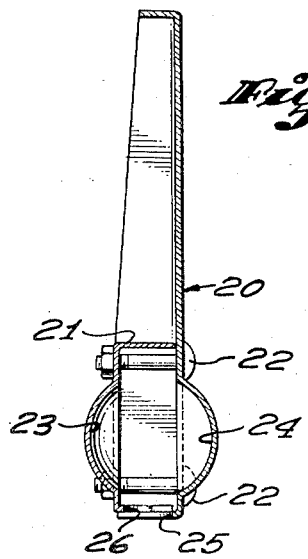
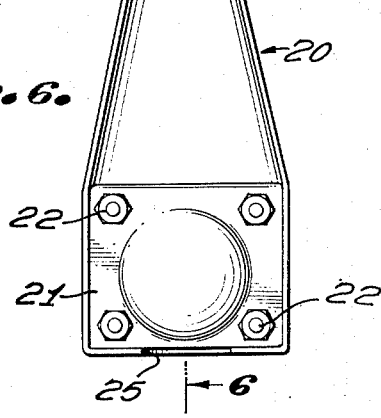
INVENTOR:
JOSEPH L. BROCK
BY O. O. Martin
ATTORNEY.

Patented Aug. 1, 1950

2,517,176

UNITED STATES PATENT OFFICE 2,517,176

TRAILER HITCH BALL COVER

Joseph L. Brock, Anselma, Pa.

Application November 6, 1948, Serial No. 58,721

4 Claims. (Cl. 280—33.17)

The present invention relates to a device for covering spherical objects such as the ball-shaped studs which form members of certain well known types of automobile trailer hitches.

Such ball studs are generally supported by brackets which are fastened to the rear end of the automobile and extend rearwardly beyond the bumper thereof. When not in use, they are so exposed that they quickly gather dirt and become so rusty that they gradually fail to provide a tightly fitting and smoothly operating universal joint.

It is, in view of the foregoing, the object of the present invention to provide a cover for such trailer hitch ball studs which is inexpensive to manufacture and convenient to operate. It is a further object to provide a cover which is adjustable to fit various sizes of ball studs. A further object is to provide a ball cover which is so shaped as to conform to the designs of bumpers ordinarily used on automobiles at the present time thereby to enhance the appearance of the vehicle. These and other objects of the invention will be better understood upon perusal of the following detail description and reference is invited to the accompanying drawings, of which:

Fig. 1 is a sectional side elevational view of a device embodying the invention;

Fig. 2 is a plan view of the device taken in direction of arrow 2 of Fig. 1;

Figs. 3 and 4 illustrate a modification of the above described device; and

Figs. 5 and 6 show further modifications the purpose of which is hereinafter fully explained.

As indicated in the drawings, the body of the cover is preferably made in one piece, the lower portion 1 of which preferably is cylindrical in shape while the upper portion 2 is cut back on a slant to provide a substantially semi-conical tip corresponding generally in shape to the guards ordinarily rising from such automobile bumpers.

A cylindrical recess 3 is sunk far enough into the lower end of the cover to accommodate therein the ball stud A of a conventional trailer hitch and it is important to note that the inner end of this recess is made spherical freely to encompass the ball of the stud. For the sake of simplicity, the ball stud is hereinafter sometimes referred to as the ball.

The device is held firmly in position on the ball by means of a resilient member which is composed of a pair of circular prongs 5, 6 and the latter are secured in a central position within the inner end of the recess by means of a bolt or rivet 7. It is noticed that this rivet is seated in a perforation through the inner wall of the recess and that it extends into the space 2ª within the semi-conical tip of the device. When so constructed it is a simple matter to enter the rivet so as to mount the resilient member in position thereon and to apply the pressure to the rivet necessary solidly to clamp the spring member in position.

It is to be understood that sufficient space should be allowed between the resilient member and the inner wall of the recess to permit of expansion of the resilient member as required to mount the device on the ball stud and to withdraw it therefrom. It is also important to note that the tension of the resilient prongs draws the device firmly about the ball so that it will remain solidly clamped in position thereon during ordinary operation of the vehicle.

The contour of the tip merely serves to emphasize that the device adapts itself to production of artistic designs which will conform to the style of bumper guards used. When the device, so designed, is highly polished and chrome plated, it will form an attractive addition to the rear end of the vehicle at the same time it will protect the trailer hitch ball from injury due to accumulation of dirt and the effect of atmospheric conditions.

In the device above described, spring tension is depended upon to maintain the cover in position on the ball. It may, however, at times be found preferable more positively to clamp the cover in position and devices including this feature are hereinafter described.

As shown in Fig. 3, the body of the cover 10 in most respects remains as above outlined, the shape of the recess 11 thereof alone being modified by providing the screw threads 12 in the side wall thereof. These threads are added for the purpose of receiving an annular clamping member 13, the outer peripheral surface of which is threaded to seat in the screw threads 12.

Since the base B of the ball stud generally is larger than the minimum diameter C of the ball it is necessary to make the clamping member in two parts, 14 and 15 and a dowel pin 16 is mounted in each part for engagement with a recess in the other part.

These pins serve properly to align the two parts, after they have been applied to the ball; and to maintain the parts locked together for engagement with the screw thread 12, when the cover is subsequently seated on the ball. The clamping member is then screwed into the cover until the ball is rigidly clamped in position therein.

It is noticed that, in this case, the inner end of the recess is made conical for more complete adaption to balls which vary considerably in diameter. But the spherical shape of Fig. 1 may be retained if found preferable. It is also of advantage to provide projections in the under surface of the clamping member for engagement by a suitable spanner wrench and such projections are indicated at 17 in Figs. 3 and 4.

It is important that means be provided for locking the clamping member in position against the ball and such locking means is for the sake of simplicity and clearness shown in the form of a set screw 18.

If preferred, the clamping member may be mounted to telescope into the body position of the ball cover and such device is illustrated in Figs. 5 and 6. The lower portion of the cover is shown rectangular in shape, forming a recess, and of a size to receive therein a rectangular box-shaped clamping member 21.

These parts are made with aligned perforations through which a plurality of clamping bolts 22 extend. It is important to note also that the body and the clamping member are made with opposed, spherical recesses 23, 24, and that these recesses are diametrically aligned to form seats for the ball of the trailer hitch stud.

When the bolts are tightened to draw the recessed parts of the members about the ball, it is found that the cover may be locked so tightly in position thereon that it will resist an ordinary pressure tending to dislodge the cover. It is, of course, necessary to cut circular recesses 25, 26 in the bottoms of the cover body and the clamping member to provide space for the shank of the ball stud. It is seen that the device, when mounted in position on the ball of the stud not only protects the ball from corrosive influence of the elements and from damage due to collision with parts of other vehicles or stationary objects but also serves as a warning to drivers of other cars who might not notice the uncovered ball.

It frequently happens in heavy traffic, for example, when a car fitted with such trailer stud comes to a sudden stop that the front bumper of the next following car jumps the stud ball and so interlocks the cars. But, where the cover of the invention is present, not only is warning given, but the cover acts as a guard to prevent such interlocking.

The devices hereinbefore described are illustrative of means for clamping the cover tightly about the ball of a trailer hitch stud. It is not, however, intended thereby to be limited to the combinations and arrangements shown, but I reserve the right to embody modifications thereof within the scope of the claims hereto appended.

I claim:

1. A cover for the ball of a trailer hitch stud comprising an elongated body having a rectangular recess in the lower portion thereof, a rectangular clamping member seatable within said recess, the body and the said member having diametrically aligned spherical recesses forming a seat for said ball, and means engaging the body and the member to clamp the parts tightly about the ball.

2. A cover for the ball of a trailer hitch stud comprising, an elongated body having a rectangular recess in the lower portion thereof, a rectangular clamping member seatable within said recess, the body and the said member having diametrically aligned spherical recesses forming a seat for said ball, and bolts extending through the body and the member to clamp the cover in position on the ball.

3. A cover for the ball of a trailer hitch stud comprising, a box-shaped body, a rectangular box-shaped clamping member seatable within the lower portion of said body, the clamping member and the body having diametrically aligned spherical recesses forming a seat for said ball, and means for clamping the body and the member in position on the ball.

4. A cover for the ball of a trailer hitch stud comprising, a box-shaped body, the lower portion of which is rectangular, the upper part of the body being upwardly tapered to a substantially semi-conical guard, a rectangular box-shaped clamping member seatable within the lower rectangular portion of said body, the clamping member and the body having diametrically aligned spherical recesses forming a seat for said ball, and means for clamping the body and the member in position on the ball.

JOSEPH L. BROCK.

REFERENCES CITED

The following references are of record in the file of this patent:

UNITED STATES PATENTS

| Number | Name | Date |
|---|---|---|
| 1,017,173 | Ryan | Feb. 13, 1912 |
| 1,587,074 | Humphrey | June 1, 1926 |
| 1,889,297 | Russell | Nov. 29, 1932 |